J. C. LIBERTY.
BOBBIN WINDING MACHINE.
APPLICATION FILED SEPT. 27, 1906.
918,454.
Patented Apr. 13, 1909.
3 SHEETS—SHEET 3.
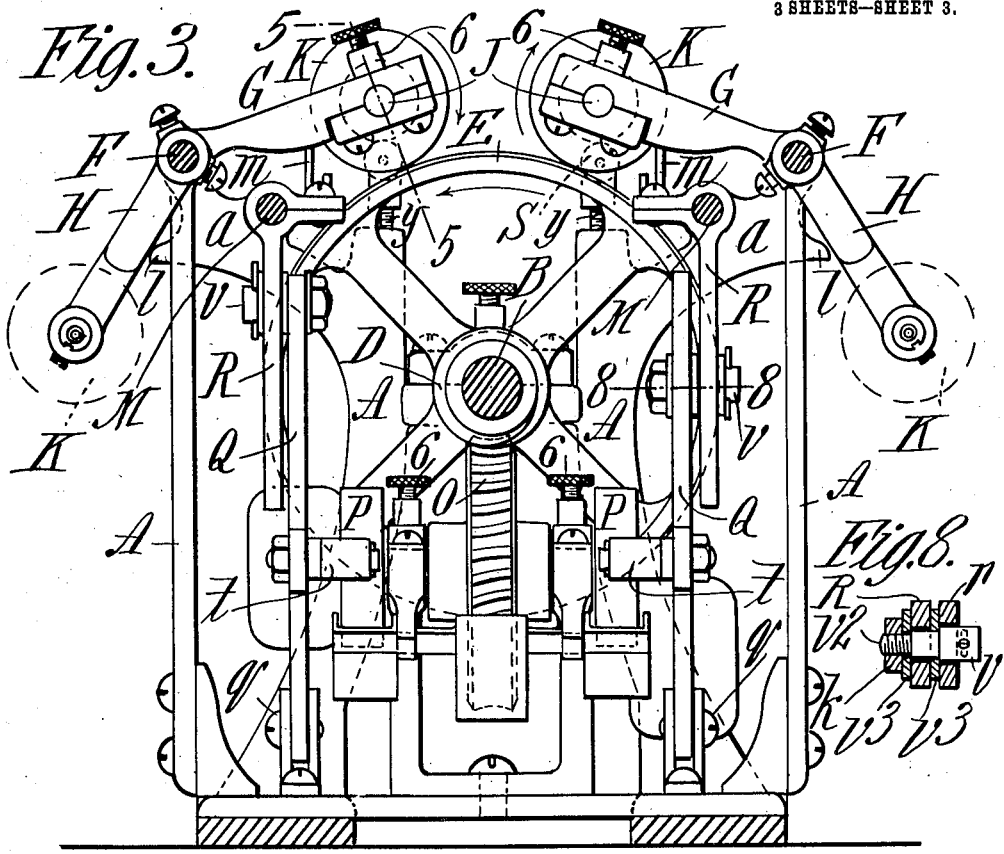

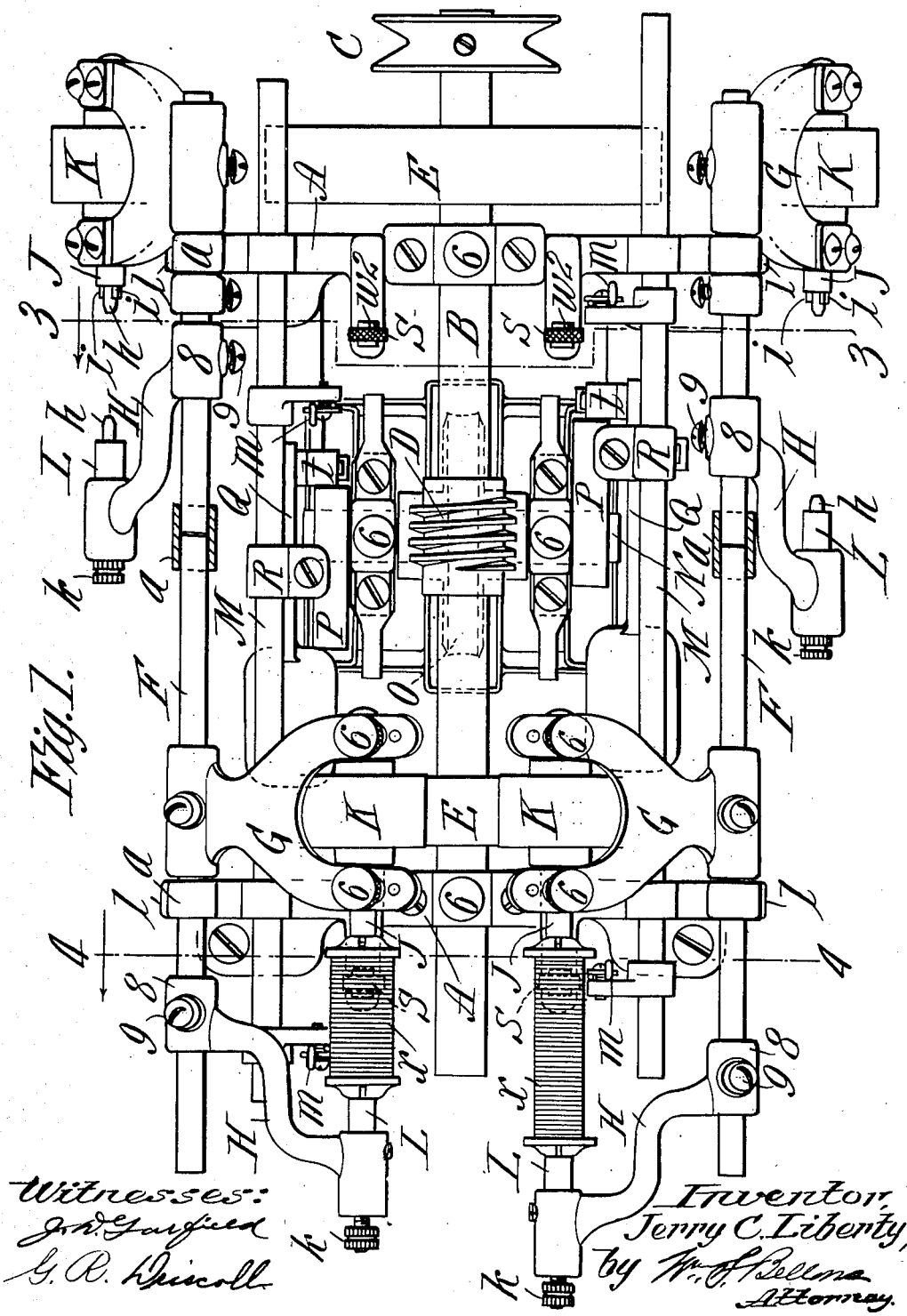

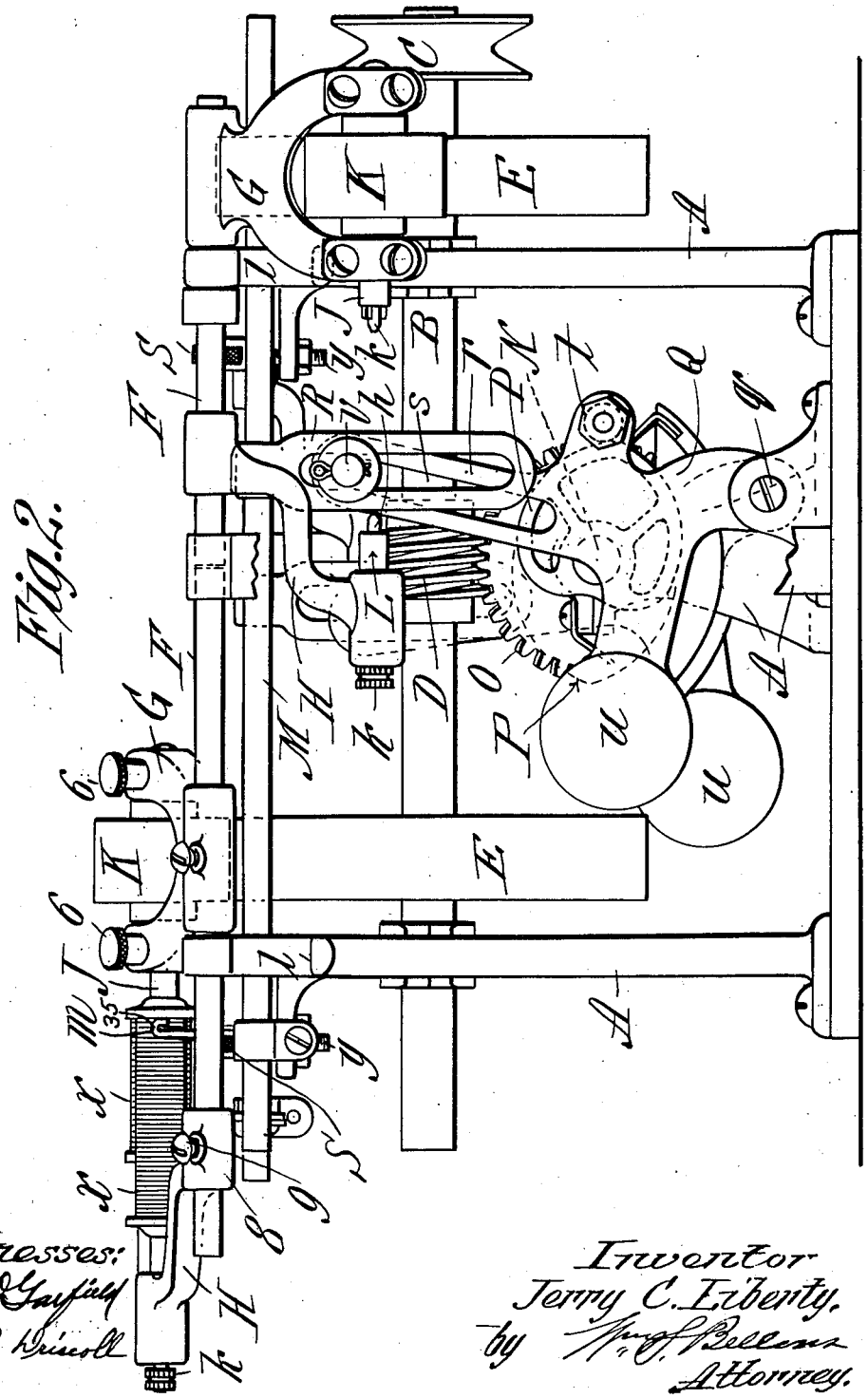

UNITED STATES PATENT OFFICE.

JERRY C. LIBERTY, OF EASTHAMPTON, MASSACHUSETTS, ASSIGNOR OF ONE-HALF TO THOMAS F. LYNN, OF EASTHAMPTON, MASSACHUSETTS.

BOBBIN-WINDING MACHINE.

No. 918,454.  Specification of Letters Patent.  Patented April 13, 1909.

Application filed September 27, 1906. Serial No. 336,409.

*To all whom it may concern:*

Be it known that I, JERRY C. LIBERTY, a citizen of the United States of America, and resident of Easthampton, in the county of Hampshire and State of Massachusetts, have invented certain new and useful Improvements in Bobbin - Winding Machines, of which the following is a full, clear, and exact description.

This invention relates to improvements in machines for winding or spooling thread and yarn.

An object of the invention is to provide a machine of simple, inexpensive and practical construction with capabilities, in a single machine, for the performance of a large amount of work.

Another object of the invention is to provide improved means for varying the traverses of the thread guides according to the lengths of "quills" or spools being wound, and whereby in one machine some spools comparatively long and others of less length may be simultaneously wound.

Another object is to provide improved means for the holding and carrying of the spools relatively to the mechanism which imparts the winding rotations thereto.

Other objects are to generally improve, simplify, and increase the efficiency of the machine as will be hereinafter rendered apparent.

The invention consists in the combinations or arrangements of parts and the constructions of certain of the parts all substantially as hereinafter fully described and set forth in the claims.

In the drawings,—Figure 1 is a plan view of the winding machine having a duplex organization that is capable of winding two spools at each side of the machine by reason of duplicated mechanism therefor. Fig. 2 is an elevation at one side of the machine. Fig. 3 is a sectional elevation as seen beyond the plane indicated by the line 3—3, Fig. 1, viewed in the direction of the arrow. Fig. 4 is a sectional elevation of a portion of the machine especially comprising the automatic stop motion devices as seen at and beyond the plane indicated by line 4—4, Fig. 1, viewed in the direction of the arrow shown in conjunction with such section line. Fig. 5 is a sectional view more or less nearly vertically through one of the spools to be wound, and the means for supporting and rotating such spool as taken on line 5—5, Fig. 3. Fig. 6 is a sectional view of the parts shown at the left hand portion of Fig. 5, but as drawn on a plane at right angles thereto. Fig. 7 is an end view of one of the spools to be wound, showing the end cuts therein to be engaged by the spool supporting and rotating means. Fig. 8 is a sectional view on line 8—8, Fig. 3, to illustrate a detail construction to be hereinafter referred to.

Similar characters of reference indicate corresponding parts in all of the views.

In the machine shown in the present illustrations, provision is made for the support and rotation and winding of two axially alined spools or bobbins at one side of the machine, and a like number at the opposite side.

In the drawings,—A represents a frame of a design suitable for support of the various fixed and movable parts comprised in the machine; and along the middle thereof is a horizontally arranged driving shaft B having a driving pulley C thereon, a worm D at its middle, and comparatively large friction wheels E E outwardly therefrom. On suitable extensions $a$ $a$ of the frame at the upper and most widely opposite portions thereof are rocking shafts or bars F F in axial alinement and adapted to be individually and independently partially rotated in their supporting bearings. Each of these rock shafts has at suitably different portions in the length thereof a frame or bifurcated bracket G and a bracket H, each being affixed on the rocking bar. In each yoke shaped bracket G is journaled for rotation a head stock spindle J having a plain faced roller K affixed thereon, and adapted, when the yoke is properly swung inward,—the rock shaft being correspondingly rocked,—to frictionally bear peripherally on the adjacent friction wheel E.

In the semi-revoluble bracket H is a stem or short shaft L endwise slidable, but constrained against rotary movement, and the particular construction and manner of mounting this part L is clearly represented in Figs. 5 and 6 of the drawings, wherein it is seen that the bracket is formed with a necked down portion $b$ and shoulder $d$ and fitted in a cylindrical opening in the head of the bracket H at one end of which chamber is a shoulder $f$ between which and the shoulder $d$ of the short shaft is disposed a spiral spring $g$. The larger portion of the short shaft L has a longitudinal groove or spline $e$ in which engages the extremity of a stud $c$ which screw engages through the head of the bracket H and extends into the spline groove.

The spindle J on which the friction wheel K is rigidly affixed is constrained against endwise movement, as will be apparent especially on reference to Fig. 5; and the approached ends of both of the spindles J and L have axially extending studs or teats $h$, while at the base or portion back from the point of the teat $h$ at the end of the spindle J are thin opposite radial lugs or fins $i\ i$.

The spools or bobbins $x$ to be mounted in the machine and continuously rotated to cause the winding thereon of the suitably guided thread or yarn, have each an axial hole therethrough into which the teats $h\ h$ of the spindles may enter for a short distance; and the spools are made on their ends with diametrical grooves $x^2$ (see Fig. 7), in which the aforementioned lugs or fins $i$ of the rotatable spindle J may engage. The spools are made with transverse grooves $x^2$ on both of the ends thereof, as thereby no care is required to bring a proper end of the spool in juxtaposition to the inner end of the spindle J.

The action of mounting the spools between the spindles J and L, preparatory to the winding operation, is by placing one end of the spool while in a slightly oblique position with its end hole in engagement with the teat of the spindle L and forcing the spool and spindle endwise outwardly to let the opposite head of the spool come to a position for engagement by the teat and lugs of the spindle J; and then by releasing any pressure in an outward direction on the spool, the concealed spring $g$ in the head of the bracket H will cause a movement of the spool slightly in the proper endwise direction to perfect the engagement of the spool with the peculiarly formed end of the spindle J.

The construction and arrangement of parts just above described whereby one spindle L of the pair of spindles J, L, is incapable of rotation, conduces materially and in an important way to the value of the machine. It is in this connection to be appreciated that in a machine such as the present one, designed for constant or at least long protracted running, and for the winding of immense numbers of spools or bobbins, the provisions whereby spindles L are prevented from rotating precludes unnecessary wear and makes comparatively infrequent the requirement for replacement of the spindles L.

It is, of course, necessary to comparatively frequently replace the friction roll carrying spindles J, but the item of cost and trouble avoided by the non requirement of replacing spindles L will in the life of one of these bobbin winding machines be found considerable.

The stop shown as in the form of a thumb nut $k$ is provided to prevent the spindle L from being forced, by its spring, too far inwardly or displaced from its position of support in the bracket H when no spool is in supporting engagement between the pair of spindles J and L.

In this machine, capable of simultaneously winding four spools, four thread guides $m$ are provided at locations suitably adjacent or opposite a line between the approached ends of pairs of the spindles J and L, each thread guide consisting of an upstanding wire having an eye at its upper end supported and a clip $n$ which is confined by a binding screw $n^2$ on either of two comparatively long parallel horizontally and longitudinally ranging slide shafts or bars M M,—the means of support with capability for sliding movements endswise oppositely of the bars being afforded in suitable bracket like portions of the frame A.

The thread guides, the clips on which they are mounted, and the sliding shafts on which the clips are supported, are best seen in Fig. 4.

Each clip $n$, is split to form opposite ear lugs 30, through which lugs is passed a clamping screw $n^2$ by means of which the clips are adjustably held in position on bars M. An arm 31, projects at approximate right angles to the ear lug 30, and has secured thereto by means of a headed screw 34, a wire strand having a vertical arm 32, formed with a threaded eye 35 at its upper end, and having its opposite end bent into a hook 33, disposed in a plane at right angles to eye 35, hook 33 engaging one side face of arm 31, and being engaged by the head of screw 34.

The means for imparting the slow movements to the thread guides repeatedly in alternating directions for laying the thread on the rotating spool or bobbins, will be now pointed out.

N represents a shaft horizontally journaled in a suitable portion of the frame A below and at right angles to the length of the driving shaft B, and has thereon a worm wheel O which is in mesh with the aforementioned worm D on the main or driving shaft. This worm wheel shaft N has on opposite ends thereof heart shaped cams P P, these cams being here shown as set in opposition, although this particular arrangement is not material. Sidewise adjacent these cams are angular levers Q of cruciform pivotally mounted near their elbows, as represented at $q$. The upwardly extending arm $r$ of each of these levers has a slot $s$ therein (see Fig. 2); a suitable portion of the lever carries a stud or roller $t$ for bearing on the edge of the cam, and the more or less nearly horizontal arm of the angular lever is formed as, or provided with, a comparatively heavy weight $u$, the effect of which is to keep the lever, by its cam stud, always against and subject to the action of the cam, so that the expanding portions of the cam will positively produce the endwise movement of the thread carrying bar in one direction and the weight $u$ will cause the lever to follow the receding portions of the cam and cause the endwise motions of the thread carrier in the opposite direction, it being noticed that the upwardly extending member of the cam lever has an engagement with the depending bar R rigidly affixed to the slidable thread carrying bar. This depending bar R is vertically slotted to permit the play of the stud $v$ carried by the swinging cam lever Q, therein. The stud $v$ is made shouldered, as shown in Fig. 8, and with a screw threaded portion $v^2$ to receive the binding nut whereby the stud, through means of the washers $v^3$, $v^3$, setting against the shoulders at different portions of the length thereof, may be confined to and as a part of the upwardly extending arm $r$ of the cam lever. The stud, therefore, may be adjustably set nearer or farther from the fulcrum of the cam lever whereby will be imparted longer or shorter back and forth movements of the slide bar for the thread guides so that the latter will be made to move back and forth along the spools in long or short courses accordingly as the spools being wound in the machine are longer or shorter.

The rotary movement of the continuously driven main shaft causes rotation of the wheels E E and of the wheels or rollers K K in frictional bearing thereon, the latter turning the head spindles between which and the short shafts L the spools are mounted, and the spools are thereby rotated to wind the thread guided thereby by the gradual but constantly moving thread guides. And it is apparent that the slow back and forth movements of the thread guides are caused by the rotation of the worm D which slowly turns the worm wheel and its shaft, and the cams P P thereon, coacting with which are the weighted levers engaging the depending members R of the slidable thread guide carrying bars.

As shown in the drawings, the yokes G with the friction wheels K and head spindles J together with the brackets H carrying the short shafts L, are swung outwardly at the right hand end of the machine and away from peripheral contact with the friction wheel E; while these corresponding parts duplicated at the left hand end of the machine are indicated as having their working positions,—the frictionally driven wheel K being in peripheral bearing on the left hand friction wheel, it being perceived in Fig. 1 that the shaft sections F F on which the last mentioned parts are semi-revolubly mounted, are capable of independent rocking movements so that each pair of brackets G and H may be inwardly or outwardly swung, as occasion may require.

The last referred to spool carrying parts are outwardly swung to the positions shown at the right hand portions of the drawings at times when wound spools are to be removed and new spools brought in readiness to be wound.

The friction wheels E E may be faced with rubber or other material for a manifest advantage.

It will be perceived on reference to Figs. 1 and 2 that upwardly and outwardly projecting portions or noses $l$ of the frame serve to limit the outward swinging or rocking movements of the rocking bars F and brackets carried thereby so that there will be no liability of the spindle driving rollers K having contact with portions of the friction driving wheels E which are opposite their axes to result in the rotation of the spools at times other than when the spindle rotating rollers K are inwardly swung to contact at the upper portions of the frictionally driving wheels E.

Devices are located adjacent and under the positions of the spools supported at the winding position in the machine for automatically stopping the winding rotation of the spindles J and spools engaged thereby so soon as the spools have been properly fully wound. Each of these devices, individual to a single spool winding mechanism consists of a small disk S pivotally mounted at $w$ eccentrically thereof within a bracket $w^2$ therefor, which has a screw threaded stem $y$ which vertically adjustably engages through a properly located projection or portion of the frame A. Each of the brackets is made with a stop or shoulder $z$ which may engage a laterally projecting stud 7 extended from the side of the disk. The edge of each disk is preferably knurled or roughened.

At the left hand portion of Fig. 4, the position of the eccentrically pivoted disk and its stud 7 relatively to the stop shoulder $z$ is represented as under normal winding conditions, and while the spool is yet not fully filled to the desired bulk; while at the right hand portion of Fig. 4 the position of the eccentric disk and its stud 7 relatively to the stop shoulder $z$ is represented as occasioned by the fully wound condition of the spool, the thread on the revolving spool engaging the knurled edge of the eccentric disk causing about a half revolution thereof to result in a bodily lifting of the spool, and with it the short shaft L and spindle J between which the spool is carried and in unison therewith a lifting of the frictionally driven wheel K from contact with the friction wheel E—the further winding action at this point being terminated without regard to winding conditions in other portions of the machine. The attendant noticing that a given spool is motionless will outwardly swing the spool carrying parts, removing the wound spool, replace it by a new spool to be wound, reverse the position of the eccentric disk S and inwardly return the spool carrying and rotating parts for a resumption of the winding operation at this particular part of the machine.

As will be perceived from the drawings, Figs. 1 and 2, the spools at one side of the machine are shorter than those at the other: and as will be perceived from Fig. 3, the studs v are carried by the cam lever at one side at a higher point than at the other for varying lengths of traverses of the thread guides corresponding to the different lengths of the spools; and it will be also noticed in Figs. 1 and 2 that the brackets H forming one end support for the spools are endwise adjustable toward and away from the yoke frames G, as rendered possible by the provision, as parts of the brackets H, of the collars 8 which embrace and are adjustably secured by the set screws 9 to the respective rock shaft sections F.

At various places in this machine are lubricating devices, severally indicated by 6 throughout the drawings.

The journal bearing or part through which a shaft or spindle is mounted for rotation is made with a cavity 5, as represented in detail at the right hand portion of Fig. 5, grease or other lubricant being received in this cavity and having communication with the shaft or spindle, is protected from dust and mud, and also may be forced positively to the bearing by plugs 4 screw engaging in the walls of the cavity.

I claim:—

1. In a spool winding machine, in combination with supporting shafts, thread guides, each composed of a clip received by said shafts having opposite ear lugs, a screw passed through said ear lugs, an arm projecting from said clip, a wire strand having a vertical arm formed with a thread eye at its upper end and having its opposite end bent into a hook disposed in a plane at right angles to the plane of said eye, said hook engaging one side face of said arm, and a headed screw extending in said arm and having its head engaging said hook to clamp the same to said arm.

2. In a spool winding machine, a frame having a base, a driving shaft, rocking bars on opposite sides of the shaft, spool engaging means on each bar, means to operate said spool engaging means from said shaft, a transverse shaft, means to operate said last shaft from the first shaft, cams on the transverse shaft, a pair of opposed sliding shafts on said frame having thread guides thereon, a vertically disposed depending bar rigidly secured to each sliding shaft and provided with a vertical slot, a pair of angular levers, each lever being composed of two pairs of arms arranged in opposite relation, the lower end of one arm being pivoted to said frame above the base thereof, the arm opposite to said first arm extending upwardly and being provided with a longitudinal slot, a stud adjustably mounted in said slot and operating in the slot of said depending bar, a stud carried by a third of said arms to engage one of said cams, and a weight on the fourth of said arms, said arm and its weight being disposed at points above the base of the frame.

3. In a spool winding machine, a frame having a base, a driving shaft, spool engaging means carried by the frame, means for actuating said spool engaging means from said shaft, a transverse shaft in gear with said driving shaft, sliding shafts carrying thread guides, a depending slotted bar rigidly secured to each slide shaft, cams on the transverse shaft and levers of cruci-form each having four arms, one of said arms being pivoted to said frame above its base, a second arm being slotted and having a member adjustably mounted in the slot and sliding in said slot of one of the bars, to reciprocate said bar, a third arm having a weight on its free end, all of said arms and said weight being disposed and operating at points above the base of the frame, the fourth arm having a part engaging one of the cams.

4. In a spool winding machine, a frame having a base, a driving shaft, spool engaging means carried by the frame, means for rotating said spool engaging means, a transverse shaft in gear with said driving shaft, horizontal shafts carrying thread guides mounted in said frame so as to have longitudinal reciprocating sliding movement, and means to actuate each of said shafts composed of a member carried by each shaft, and a multi-arm element having one of its arms pivoted to said base, having its second arm movably connected to said member carried by said shaft so as to slide along the length thereof while reciprocating the same, having its third arm weighted, and having its fourth arm provided with a part which engages one of said cams.

Signed by me at Springfield, Mass., in presence of two subscribing witnesses.

JERRY C. LIBERTY.

Witnesses:
Thos. F. Lynn,
Wm. S. Bellows.